United States Patent [19]

Chechile et al.

[11] Patent Number: 4,890,812
[45] Date of Patent: Jan. 2, 1990

[54] TEMPERATURE COMPENSATED MOUNT FOR SUPPORTING A RING LASER GYRO

[75] Inventors: Robert A. Chechile, Thousand Oaks; Agop H. Cherbettchian, Santa Monica; Sampson Spry, III, Thousand Oaks; Khalig F. Baig, Canoga Park, all of Calif.

[73] Assignee: Litton Systems, Inc., Beverly Hills, Calif.

[21] Appl. No.: 151,007

[22] Filed: Feb. 1, 1988

[51] Int. Cl.$^4$ .......................................... F16M 13/00
[52] U.S. Cl. ..................................... 248/674; 248/901
[58] Field of Search ................... 248/637, 674, DIG. 1

[56] References Cited

U.S. PATENT DOCUMENTS

| | | | |
|---|---|---|---|
| 4,115,004 | 9/1978 | Hutchings et al. | 372/94 |
| 4,267,995 | 5/1981 | McMillan | 248/56 |
| 4,299,363 | 11/1981 | Datschelski | 248/56 |
| 4,411,527 | 10/1983 | Gomertafelder et al. | 356/350 |
| 4,425,040 | 1/1984 | Ljung et al. | 356/350 |
| 4,436,423 | 3/1984 | Kumar et al. | 356/350 |
| 4,505,006 | 3/1985 | Andre | 248/56 |
| 4,533,248 | 8/1985 | Baumann | 372/94 |
| 4,536,087 | 8/1985 | Shernoff | 356/350 |
| 4,632,555 | 12/1986 | Malvern | 356/350 |
| 4,634,091 | 1/1987 | Butler | 248/637 |
| 4,678,335 | 7/1987 | Berg | 356/350 |
| 4,679,755 | 7/1987 | Marsault | 248/DIG. 1 |
| 4,771,644 | 9/1988 | Meron | 74/5 R |

Primary Examiner—Ramon O. Ramirez
Assistant Examiner—Robert A. Olson
Attorney, Agent, or Firm—Roy L. Brown

[57] ABSTRACT

To prevent a supported block, particularly a ring laser block, from translating, rotating, or being stressed with changes in temperature, the block to be supported carries a plurality of, typically four, coplanar radially-outward-extending circularly cylindrical posts. The posts are grasped by compliant axially-split sleeves or mounts which engage posts. The mounts are supported by a surrounding substantially circular frame. The mounts are substantially equiangularly positioned around the frame, and the posts are correspondingly positioned upon the block. The frame is surrounded by a case which is adapted to be fastened to another structure such as a vehicle or gimbal. At points angularly positioned around the frame, substantially equiangularly positioned from the adjacent sleeve fixtures, the frame is rigidly attached to the case. The mounts and the frame are both made of a material, typically Invar, having a known temperature coefficient of expansion. The case is fabricated of a material, typically mu metal, having a higher coefficient of thermal expansion than that of the frame.

4 Claims, 3 Drawing Sheets

TEMPERATURE COMPENSATED MOUNT FOR SUPPORTING A RING LASER GYRO

RELATED PATENT APPLICATIONS

This patent application is related to copending patent application, Ser. No. 150,781, filed Feb. 1, 1988, the same date as the filing of this application, for COMPLIANT MOUNT FOR SUPPORTING A RING LASER GYRO BLOCK, by Robert A. Checile, Agop H. Cherbettchian, and Khaliq F. Baig, assigned to the same assignee, and incorporated herein by reference as if fully recited herein.

BACKGROUND OF THE INVENTION

Ring lasers are used to measure angular velocity, displacement, or acceleration about particular axes. Frequently they measure such angular velocity about only one axis. However, three ring lasers may be made within a single laser block, and their output signals are useful in measuring angular velocity about three mutually perpendicular axes.

It is important that ring laser blocks used in ring laser gyros neither translate nor rotate with changes in temperature, for an error can be introduced, and it would not be apparent that the measured angular velocity, or other measurement, does not contain a component of such error signal. Further, when such blocks are supported by supports fabricated of material having a different temperature coefficient of expansion than the block itself, the block may be stressed by forces transmitted to the block at the points of connection between the support and the block.

The block is typically made of dimensionally stable inorganic pore-free glass ceramic material having both a glass-like and crystalline structure that results in a near-zero coefficient of thermal expansion. The support, however, is usually fabricated of a different material, typically a metal, having a different coefficient of thermal expansion. Because of the difference between the coefficients of expansion of the block and the support, there is a tendency for the support to transmit temperature-caused forces or torques to the block. Such forces or torques can internally stress the block, causing misalignment of optical components or of the block. Such misalignments frequently cannot be tolerated.

BRIEF DESCRIPTION OF THE INVENTION

In the apparatus of the invention, the block to be supported carries a plurality of—typically four—coplanar axially-extending circularly cylindrical posts. The posts are substantially uniformly angularly distributed about a first axis. The posts are grasped by mounts so that the block is angularly constrained against turning about such first axis relative to the supporting structure.

The supporting structure comprises a substantially circular mounting structure or frame, which surrounds the block. The mounts are substantially equiangularly positioned around and attached to the interior of the frame in positions opposite the posts. The mounts and the frame are both made of materials having known coefficients of thermal expansion. For example, that material may be a metal alloy, such as the alloy known by the trade mark Invar, which has a low coefficient of thermal expansion.

The frame is surrounded by an instrument case, or it may be called an intermediate supporting structure, fabricated of a material having a coefficient of thermal expansion that is higher than that of the frame. The case is adapted to be fastened to another structure such as a vehicle or gimbal. The case need not, but may be, a ring. The case surrounds the frame, and it has an inner diameter, about the above-mentioned first axis, that is greater than the outer diameter of the frame. Typically the case is fabricated of metal such as mu-metal. The case may be an integral part of the instrument containment apparatus.

The frame is rigidly attached to the case at points angularly positioned about the above-mentioned first axis, substantially equiangularly positioned from their adjacent mounts.

As the temperature increases, both the case and the frame expand radially outward, but the tendency of points on the frame to move outward is not so great as the tendency of the case to move outward. Although the mounts, attached to the frame, tend to move outward under the influence of increased temperature, the outward forces exerted on the frame by the case, stress the frame, pulling the frame outward and forcing the mounts to move inward. The inward movement caused by the stress counters the outward movement caused by the temperature increase. The mounts remain substantially stationary.

Similarly, as the temperature decreases, both the case and the frame contract radially inward, but the tendency of points on the frame to move inward is not so great as the tendency of the case to move inward.

The mounts tend to move inward under the influence of decreased temperature. Because of the attachments of the frame to the case, the forces exerted at the points of attachment between the frame and the case, stress the frame and counter the temperature effects to cause the mounts not to move inward but to remain stationary.

It is therefore a feature and an object of the invention to support a block or mass, typically a laser block, without temperature changes tilting, translating, or stressing the block.

It is a more specific feature and object of the invention to compensate for temperature changes to minimize translation, rotation and stress in a supported structure.

DETAILED DESCRIPTION OF THE INVENTION

Figure 1:
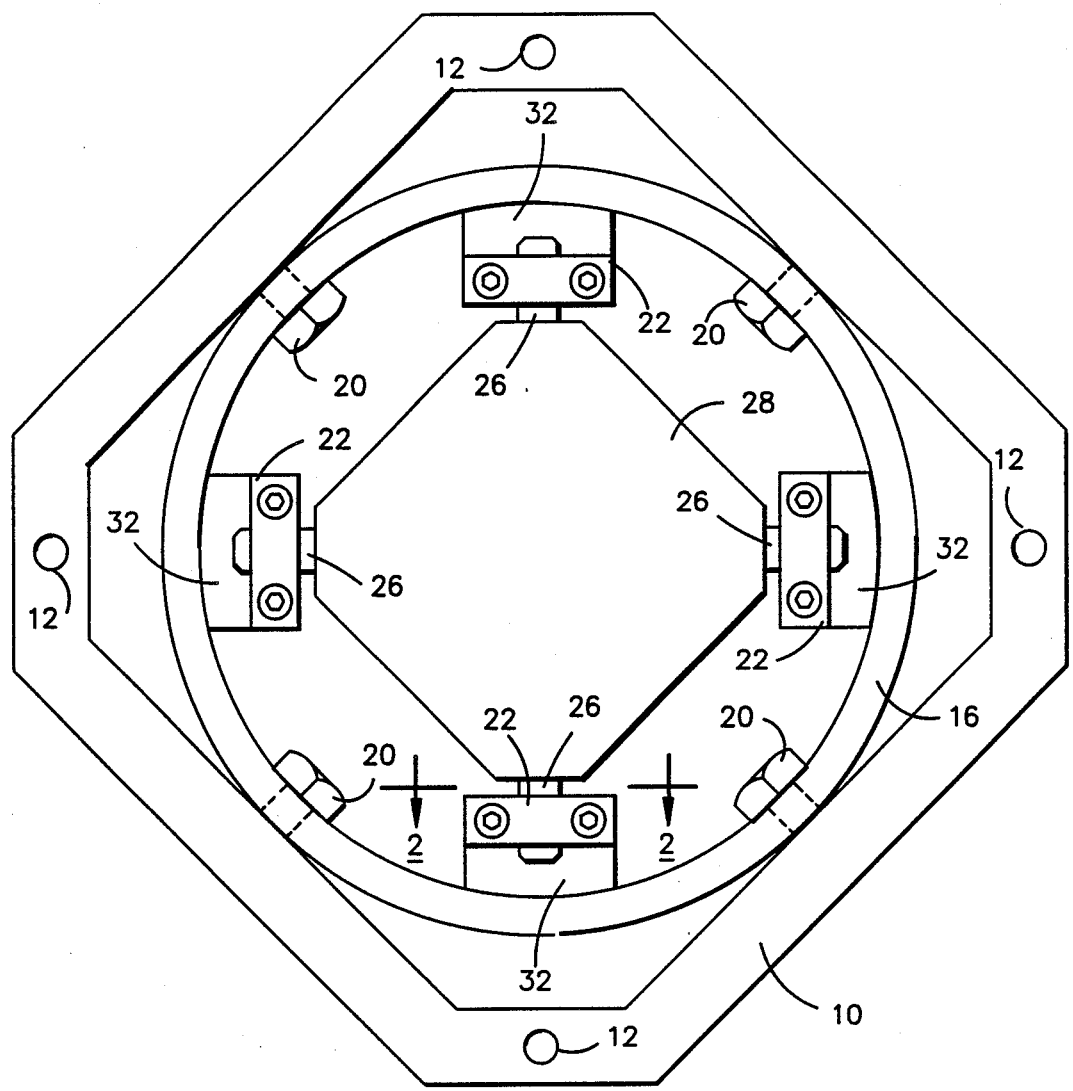
FIG. 1 is a plan view of a preferred embodiment of the Invention.

The apparatus of the invention is shown in FIG. 1. The case 10 is configured and adapted, for example by screws or bolts through openings 12, to be attached to a vehicle or other apparatus. The case 10 forms an opening therein which is large enough to receive and enclose the frame 16. The frame 16 is attached at a plurality of substantially uniformly angularly distributed points about a first axis, for example by screws 20, to the case 10. Angularly distributed about the first axis and centered between the screws 20, mounts 22, equal in number to the attaching points between the case and the frame, are attached to the frame 16. The details of the mounts 22 are shown in a copending patent application entitled, "Compliant Mount for Supporting a Ring Laser Gyro Block.", assigned to the same assignee and filed on the same date as this applicaation, by Robert A. Chechile, Agop H. Cherbettchian, and Khaliq F. Baig.

The action of the invention is not dependent on the use of the aforementioned mounts, however, for any suitable means of grasping the ring laser block may be employed for use with the invention.

Figure 2A:
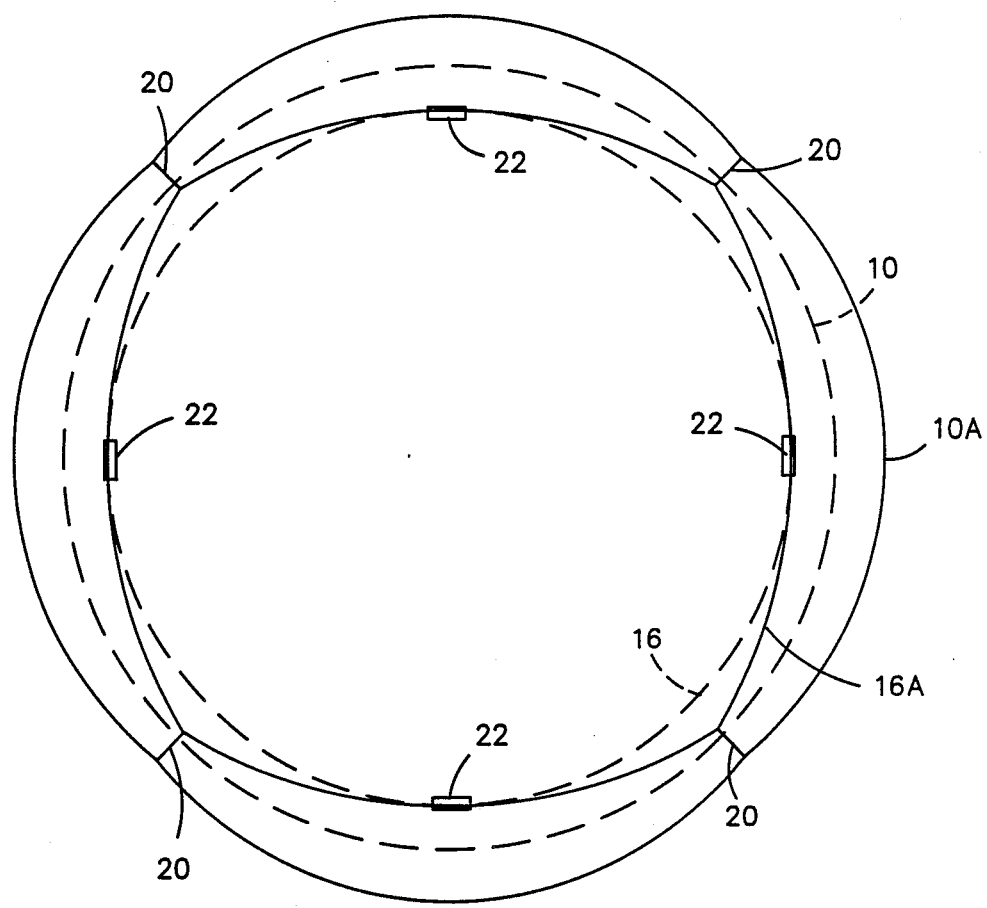
FIGS. 2A and 2B are schematic views of the relation, at varying temperatures, between the frame and the case of the invention.
Figure 2B:
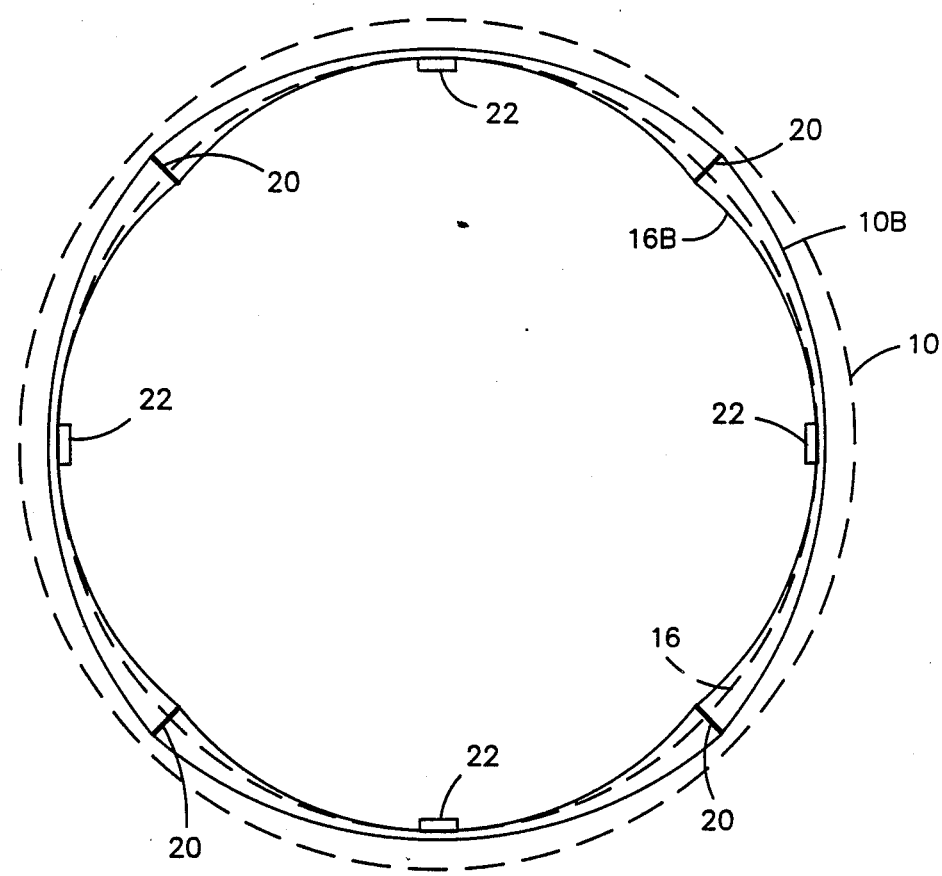

In FIGS. 2A and 2B, the case 10 and frame 16 are idealized as circular rings. The figures are schematic diagrams showing two rings 10 and 16 attached together at four angularly symmetrically positioned locations 20 about a first axis (not shown,) within the block 28 (not shown), to hold the mount positions 22 radially and angularly stationary as the case and frame rings flex during temperature changes. The rings 10, 10A, 10B correspond to the case 10 of FIG. 1; the rings 16, 16A, 16B correspond to the frame 16 of FIG. 1; the attachments 20 correspond to screws 20 of FIG. 1; and the positions 22 on the ring 16 correspond to the mounts 22 of FIG. 1.

The dashed lines show the unstressed position of concentric rings. The dashed lines 10A and 16A in FIG. 2A show the configuration of the rings at an elevated temperature. The position is the unflexed rings 10 and 16. Both rings tend to expand with elevated temperature. But the ring 10 expands faster than the ring 16.

Because the rings are attached together at 20, they must there expand together. The ring 10 is there forced inward, and the ring 16 is there forced outward. Forcing of the ring 16 outward stresses it, and the portions of the ring 16 adjacent the mounts 22 are forced inward, countering the tendency of the ring 16 to expand outward under increased temperature.

FIG. 2B shows, at 10B and 16B, the configuration of the two rings 10 and 16 at reduced temperature. The rings tend to contract with decreased temperture. But the ring 10 contracts faster than ring 16. Because the rings are attached together at 20, they must there contract together. The ring 10 is there forced outward, and ring 16 is there forced inward. Forcing of the ring 16 inward stresses it, and the portions of the ring 16 adjacent the mounts 22 are forced outward, countering the tendency of the ring 16 to contract inward under decreased temperature.

By choosig the materials of rings 10 and 16, and choosing the dimensions and shape of rings 10 and 16, the mounts 22 are held radially stationary.

Thus, the apparatus of the invention, fabricated of a first material, fixedly folds a block that is fabricated of a second material without applying forces or torques to the second material during changes in temperature.

Although the invention has been described in detail above, it is not intended that the invention shall be limited by that description, but only according to the description taken together with the accompanying drawings and the appended claims.

We claim:

1. In combination:
    a plurality of mounts;
    a frame, surrounding and supporting said mounts symmetrically about a first axis; and
    a case surrounding and rigidly attached to said frame at a set of points equal in number to the number of said mounts and said attachment points being equiangularly symetrically distributed about said first axis at angular positions substantially midway between said mounts;
    said case having a higher coefficient of thermal expansion than the coefficient of thermal expansion of said frame to cause the motions of said case and said frame under changes of temperature to compensate for each other and cause said mounts to remain substantially stationary over a range of temperatures.

2. Apparatus as recited in claim 1 in which said mounts are four in number and distributed ninety degrees apart about said first axis.

3. Apparatus as recited in claim 2 in which said attachments are angularly displaced about said first axis by substantially forty five degrees from said mounts.

4. Apparatus as recited in claim 3 in which said frame is fabricated of Invar and said case is fabricated of mu metal.

* * * * *